United States Patent
Zhang et al.

(10) Patent No.: US 6,547,839 B2
(45) Date of Patent: Apr. 15, 2003

(54) METHOD OF MAKING AN ELECTROCHEMICAL CELL BY THE APPLICATION OF POLYSILOXANE ONTO AT LEAST ONE OF THE CELL COMPONENTS

(75) Inventors: Zhiwei Zhang, Basking Ridge, NJ (US); Chi-Kyun Park, Flanders, NJ (US); Lu Ying Sun, Randolph, NJ (US); Chul Chai, Saddle River, NJ (US)

(73) Assignee: SKC Co., Ltd., Suwon (KR)

( * ) Notice: Subject to any disclaimer, the term of this patent is extended or adjusted under 35 U.S.C. 154(b) by 178 days.

(21) Appl. No.: 09/766,672

(22) Filed: Jan. 23, 2001

(65) Prior Publication Data

US 2002/0136957 A1 Sep. 26, 2002

(51) Int. Cl.$^7$ .................................................. H01M 6/00
(52) U.S. Cl. .................... 29/623.1; 29/623.3; 29/623.5; 429/127; 429/129; 429/142; 429/144
(58) Field of Search ............................... 29/623.1, 623.3, 29/623.5; 429/127, 129, 142, 144

(56) References Cited

U.S. PATENT DOCUMENTS 5,456,000 A    10/1995   Gozdz et al. .............. 29/623.2
5,681,357 A    10/1997   Eschbach et al. .......... 29/623.5
5,716,421 A    2/1998    Pendalwar et al. ........ 29/623.2

FOREIGN PATENT DOCUMENTS

JP        2000-7819      *  1/2000   ............... C08J/9/26
JP        2000-277152    *  10/2000  ........... H01M/10/40

* cited by examiner

Primary Examiner—Carol Chaney
Assistant Examiner—Dah Wei D. Yuan
(74) Attorney, Agent, or Firm—Nixon & Vanderhye P.C.

(57) ABSTRACT

Lithium-ion electrochemical cells include an anode, a cathode and a separator between the anode and cathode, wherein at least one of the anode, cathode and separator includes a polysiloxane coating thereon. Most preferably, the polysiloxane coating is the polymerized reaction product of dimethyl siloxane and tetra(trimethylsiloxy) silane), and is present on the surface in an amount between about 0.05 to about 0.17 mg/cm$^2$. After being coated with the polysiloxane adhesive, the electrodes and separator can easily be attached one to another at ambient temperature by application of pressure using a hand roller or with a laminator, and then subsequently formed into a spiral or stacked structure for placement in a battery cell case.

7 Claims, 1 Drawing Sheet

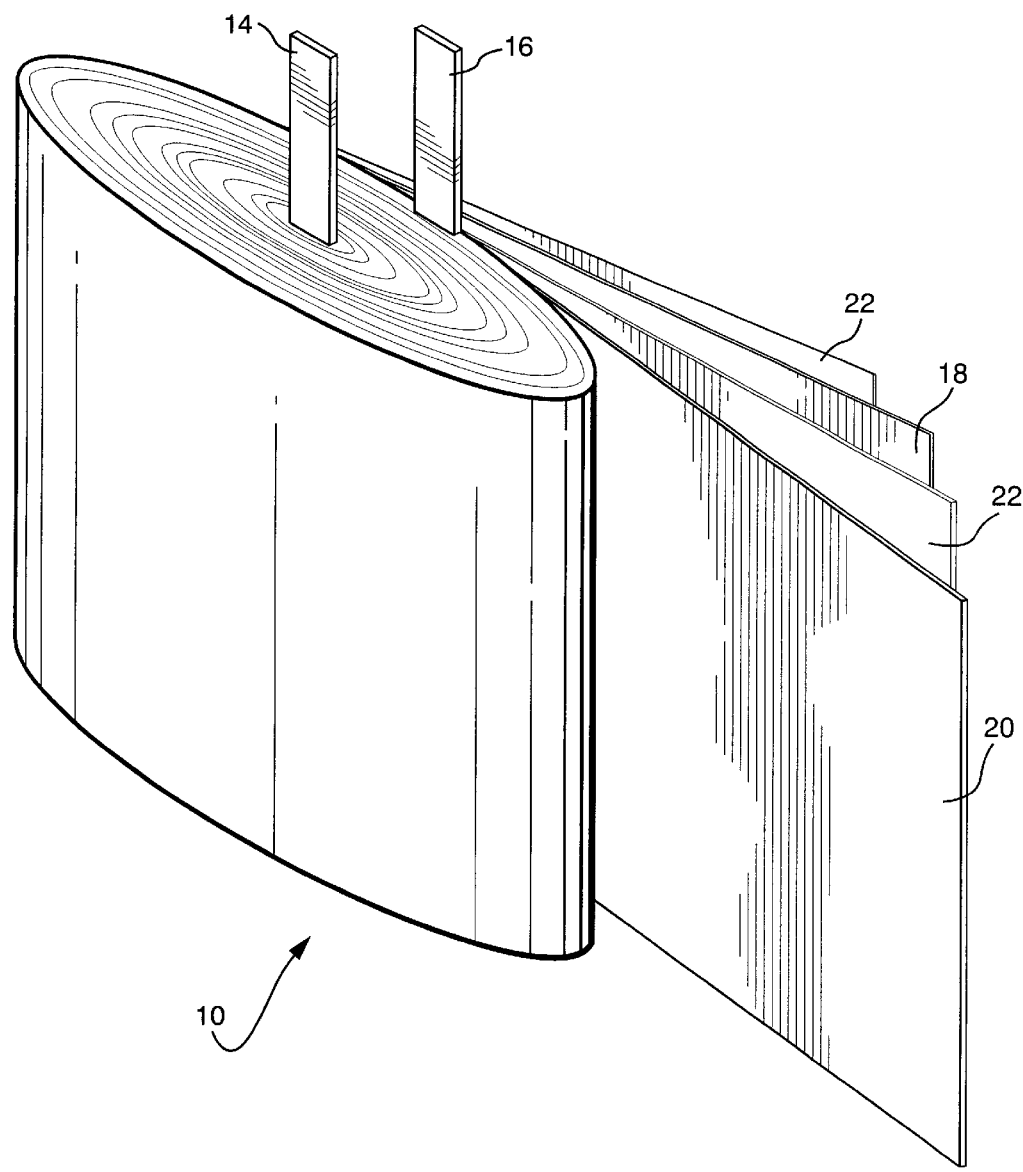

METHOD OF MAKING AN ELECTROCHEMICAL CELL BY THE APPLICATION OF POLYSILOXANE ONTO AT LEAST ONE OF THE CELL COMPONENTS

FIELD OF THE INVENTION

The present invention relates to rechargeable lithium-ion cells and the methods for making the same. In preferred forms, the present invention is embodied in a polysiloxane-based adhesive coating on the cell's anode, cathode and/or separator sheet.

BACKGROUND AND SUMMARY OF THE INVENTION

Conventional secondary lithium-ion cells are typically composed of a negative electrode (anode, such as carbon), a positive electrode (cathode, such as $LiCoO_2$, $LiNiO_2$, and $LiMn_2O_4$) and a separator (typically a microporous polyolefin film). The typical fabrication of such a cell involves winding the anode, cathode and separator to form a spiral structure colloquially known as a "jellyroll". The jellyroll is then encased in a steel or aluminum can. Alternatively, for relatively large-sized batteries, the various components may be the stacked together.

More recently, flexible packaging has emerged as the technology to replace the conventional metal case. Such flexible packaging offers the advantages of flexibility in shape and thickness, which makes it especially useful for the fabrication of large and thin cells, for example, batteries used for laptop computers.

One typical approach of making such a cell is described in U.S. Pat. No. 5,456,000, the entire content of which is expressly incorporated hereinto by reference. In the method described in the '000 patent, the plasticized anode, cathode and separator are heat-laminated together. A plasticizer, such as dibutyl phthalate (DBP), is removed by solvent extraction or by other methods. The pore-generated laminate is then ready for adsorbing electrolyte—in other words, is ready for activation. With this approach, at least one of the electrode current collectors needs to be a screen-type collector to ensure plasticizer removal. However, screen type current collectors, such as Al and Cu grids, easily form burrs along their cut edge, which are likely to poke through the separator and cause the cell to short internally. Also, the extraction process is not friendly from a manufacturing point of view.

Another approach is disclosed in U.S. Pat. Nos. 5,716,421 and 5,681,357, the entire content of each being expressly incorporated hereinto by reference. In general, this prior approach involves the coating of polyethylene (PE) or polypropylene (PP) separator sheets with gel-forming poly (vinylidene fluoride) (PVDF). In this prior process, the anode, cathode and separator for conventional liquid Li-ion cells can be utilized. Generally, the jellyroll is made and is enclosed in plastic packaging. After conventional electrolyte is injected into the packaging, the gelling process is performed at 90° C. between two heated metal plates for a few minutes followed by a quenching step. With this approach, the electrodes and separator are "bonded" together due to swelling of the PVDF.

Another approach involves so-called "ionic gel-polymer electrolyte" technology, as disclosed in commonly owned copending U.S. Patent Application Serial No. 09/760,720 filed on Jan. 17, 2001 the entire content of which is expressly incorporated by reference. With this approach, conventional liquid lithium-ion electrodes and separators are used. Similar to conventional cells, a jellyroll or electrode stack is prepared. After enclosing the jellyroll or electrode stack in a flexible package, a special electrolyte is injected. Under certain treatment, such as heating, the electrolyte transforms into a gel-like state and thus offers the advantage of exhibiting a non-leaking property. At the same time, the gel may offer adhesion or bonding effect (to some extent) between the electrode and separator.

In all cases, in order to obtain better rate and cycling performance characteristics, a uniform and intimate contact between the electrodes and separator must be maintained. Wrinkles in the separator, misalignment of the positive and negative electrodes and/or uneven spacing between the electrode and separator will deteriorate the cycling performance because intercalation of lithium ions into the anode will be more favorable in one area as compared to another area thereby causing lithium plating. Once lithium starts plating, the cell will experience accelerated capacity fading. During winding of the electrodes and separator, this problem can be minimized through proper tension control and alignment of the strips of battery components.

However, for relatively large-sized batteries, tension control becomes more difficult. Hence, the manufacturing trend for such large-sized batteries seems to be to stack the individual components. In addition to the advantages noted above, stacking of the individual components also allows greater flexibility to the manufacturer to change the cell size and/or shape and thereby offer higher cell energy cell densities.

It would, however, be highly desirable if a manufacturing technique was provided which ensures a wrinkle-free and good alignment and intimate contact between the electrodes and the separator. It is towards fulfilling such a need that the present invention is directed.

Broadly, the present invention is embodied in the coating of a thin layer of adhesive material on the electrodes and/or separator of a lithium-ion cell. This type of coating offers a strong adhesion of the separator to either the anode or cathode and thereby ensure that an intimate contact is obtained. Also, during the assembly process, electrodes can be fixed to desired positions and good electrode alignment is achieved.

In especially preferred embodiments, the present invention involves the coating of a curable polysiloxane onto the electrodes and/or separator. Most preferably, the polysiloxane is diluted by an organic solvent, such as toluene, to form a coating solution. The coating solution can then be applied in any convenient manner, such as spray-coating, brushing or dip-coating, onto the electrodes and/or separators. The electrodes can be conventional liquid lithium-ion electrodes and the separator can be conventional polyolefin (e.g., polyethylene or polypropylene) or other freestanding separator films. After being coated with the curable polysiloxane coating solution, the electrodes and separator can be brought into contact with one another so as to be attached together to form a laminated structure. Thereafter, a jellyroll or a electrode stack is prepared. Activation of the cell can be achieved in the same manner as conventionally employed, for example, by using a traditional or gel-forming electrolyte.

These and other aspects and advantages will become more apparent after careful consideration is given to the following detailed description of the preferred exemplary embodiments thereof.

BRIEF DESCRIPTION OF THE ACCOMPANYING DRAWING

Reference will be hereinafter made to the accompanying drawing FIGURE which depicts schematically a perspective view, partly sectioned, of a rechargeable battery in accordance with the present invention.

DETAILED DESCRIPTION OF THE INVENTION

An exemplary rechargeable battery cell 10 in accordance with the present invention is depicted schematically in the accompanying drawing FIGURE. As shown therein, the battery cell 10 is generally in the form of a spirally wound laminate (colloquially known as a "jellyroll") comprised of anode and cathode tabs 14, 16, respectively, which are operatively connected to anode and cathode sheets 18, 20, respectively. The anode and cathode tabs 14, 16 are typically connected operatively to the anode and cathode sheets 18, 20, respectively, by ultrasonic welding. The anode sheet 18 may be formed of carbon, whereas the a cathode sheet 20 may be formed of a lithium oxide material such as $LiCoO_2$, $LiNiO_2$ and $LiMn_2O_4$. A separator sheet 22 (e.g., formed of a microporous polymeric material such as polyethylene, polypropylene or the like) is interposed between the anode and cathode sheets 18 and 20, respectively.

It is noted here that the anode sheet 18, cathode sheet 20 and separator 22 are depicted in the accompanying drawing FIGURE as being fanned-out for purposes of illustration only. In practice, therefore, such sheets will be housed entirely within a battery housing (not shown) which can be made from metal or plastic laminated aluminum (e.g., flexible packaging). In order to be functional as an electrochemical cell, the battery housing will also contain an electrolyte. It is on the anode, cathode and/or separator sheets 20, 22 and 24, respectively, that the polysiloxane adhesive is applied in accordance with the present invention.

The adhesive coating employed in the practice of the present invention is most preferably a polysiloxane, especially polysiloxane prepolymer which is commercially available from Dow Corning (Catalog # 280A). In especially preferred forms, the polysiloxane prepolymer will include dimethyl siloxane and tetra(trimethylsiloxy) silane. The relatively thick and viscous polysiloxane prepolymer may be diluted by an organic solvent (for example, toluene, xylene, acetone, tetrahydrofuran, butanone, and/or dioxane) to a concentration of between about 0.1 wt. % to 20 wt. % so as to achieve a viscosity that allows the polysiloxane solution to be spray-coated, brushed or dip-coated on electrodes or a separator sheet before assembly of the electrochemical cell. After being exposed to the moisture in the air, this coated thin layer of polysiloxane prepolymer will further polymerize to form a cross-linked structure at room temperature through its terminal OH groups.

Conventional liquid lithium-ion electrodes can be used. For example, a carbon anode containing 85%–90% active material and $LiCoO_2$ containing 85–94% active material may be used. Similarly, conventional separator sheets employed in electrochemical cells generally, and lithium-ion cells specifically, may be used. In this regard, separator sheets comprised of microporous polyolefin films (e.g., polyethylene or polypropylene) having a thickness of between about 0.5 mil to about 1.0 mil may be employed and are commercially available from Ticona LLC under the tradename Celgard® microporous film.

After being coated with the polysiloxane adhesive, the electrodes and separator can easily be attached one to another at ambient temperature by application of pressure using a hand roller or with a laminator. Thereafter, a stack of laminated electrode and separator assemblies is obtained.

Adequate adhesion results when the polysiloxane is coated on either the electrodes or the separator. Thus, while the data below is applicable to the situation where only the electrodes were coated with the polysiloxane adhesive, it is to be understood, of course, that in a practical manufacturing environment either one (or both) of the electrodes or separator can be coated as may be desired.

EXAMPLES

The present invention will be described in greater detail by reference to the following non-limiting Examples.

Both the anode and cathode were spray-coated with 10 wt. % polysiloxane/toluene solution, following which an electrode stack was made using as-received 1.0 mil microporous polypropylene separator sheets. After vacuum-drying at elevated temperatures of 50° C. to 1 20° C., the electrode stack was enclosed in a flexible plastic laminated aluminum bag into which 1.0 M $LiPF_6$ in ethylene carbonate (EC) :dimethyl carbonate (DMC) (1:1 by volume) was injected. A typical 740-mAh cell (3.8 x35 x62 mm, H×W×L mm) was therefore made.

The charging upper voltage limit was 4.2 V and discharge cutoff voltage was 3.0 V. Table 1 below summaries the formation efficiency. As can be seen from the data therein, for the first two cycles, the treated cell according to the present invention showed lower charge efficiency, which was possibly due to impurities from raw material and trace amounts of $H_2O$ trapped in the polymerization product. After 3–4 cycles, however, no difference was observed with regard to the charge efficiency for both the untreated and treated cells.

TABLE 1

First cycle discharge/charge efficiency of untreated and polysiloxane-treated cells at room temperature (22° C.)

|  | 1st charge mAh | 1st discharge mAh | 1st cycle efficiency | 2nd charge mAh | 2nd discharge mAh | 2nd cycle efficiency |
| --- | --- | --- | --- | --- | --- | --- |
| untreated cell | 833 | 748 | 89.8% | 763 | 747 | 97.9% |
| treated cell | 856 | 737 | 86.1% | 770 | 740 | 96.1% |

The cell retains reasonable rate capabilities if the coating is applied 10 within the range of between about 0.01 to about 0.4 $mg/cm^2$, and more preferably between about 0.05 to about 0.17 $mg/cm^2$. Table 2 below compares the rate capability of the cells with and without polysiloxane treatment. As the data show, at all discharge rates from 120 mA up to 1200 mA, the treated or coated cells showed no sign of degradation with regard to discharge capability.

TABLE 2

Rate capability of untreated and polysiloxane-treated cells at room temperature (22° C.)

| Cell # | Total capacity, mAh | 1200 mA | 900 mA | 600 mA | 300 mA | 120 mA |
| --- | --- | --- | --- | --- | --- | --- |
| untreated cell #1 | 750 | 92.8% | 98.0% | 99.2% | 99.7% | 100% |
| untreated cell #2 | 746 | 94.2% | 98.3% | 99.1% | 99.6% | 100% |
| treated cell #1 | 747 | 94.4% | 98.0% | 99.1% | 99.7% | 100% |

TABLE 2-continued

Rate capability of untreated and polysiloxane-treated cells at room temperature (22° C.)

| Cell # | Total capacity, mAh | 1200 mA | 900 mA | 600 mA | 300 mA | 120 mA |
|---|---|---|---|---|---|---|
| treated cell #2 | 749 | 91.7% | 96.9% | 98.8% | 99.5% | 100% |

The cells were charged at 350 mA to 4.2 V with 30 mA cutoff. Discharge was performed at 350 mA to 3.0 V. Such cell cycling indicated that the polysiloxane treated cells have the same cycling performance as untreated cells.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of making an electrochemical cell comprising the steps of (i) diluting a polysiloxane adhesive with an organic solvent, (ii) applying by spray-coating, brushing or dip-coating the organic solvent-diluted polysiloxane adhesive onto a surface of at least one of an anode, a cathode and a separator, and thereafter stacking the anode, separator and anode in that order so as to laminate one to another.

2. The method of claim 1, wherein the organic solvent is at least one selected from the group consisting of toluene, xylene, acetone, tetrahydrofuran, butanone, and dioxane.

3. The method of claim 1 or 2, wherein the polysiloxane is a silicon-containing prepolymer having at least one hydroxy, methoxy or ethoxy group.

4. The method of claim 3, wherein the polysiloxane is dimethyl siloxane or tetra(trimethylsiloxy) silane.

5. The method of claim 3, which further comprises allowing the prepolymer to polymerize in the presence of moisture.

6. The method of claim 1 wherein the polysiloxane is coated onto said surface in an amount between about 0.01 to about 0.4 mg/cm$^2$.

7. The method of claim 3, wherein the polysiloxane prepolymer is present at a concentration of between about 0.1 to about 20 wt. %.

\* \* \* \* \*